(12) United States Patent
Park et al.

(10) Patent No.: US 11,789,352 B2
(45) Date of Patent: Oct. 17, 2023

(54) CAMERA SYSTEM LAMINATED INTO GLASS USING MICROSENSOR AND LENS

(71) Applicant: GM Global Technology Operations LLC, Detroit, MI (US)

(72) Inventors: Jonglee Park, Troy, MI (US); Myles Mallas Moore, Royal Oak, MI (US); Julien P. Mourou, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 67 days.

(21) Appl. No.: 17/515,734

(22) Filed: Nov. 1, 2021

(65) Prior Publication Data

US 2023/0136351 A1 May 4, 2023

(51) Int. Cl.
| | |
|---|---|
| *H04N 13/00* | (2018.01) |
| *G03B 30/00* | (2021.01) |
| *B60J 1/02* | (2006.01) |
| *H04N 23/45* | (2023.01) |
| *H04N 23/54* | (2023.01) |
| *H04N 23/55* | (2023.01) |
| *H04N 23/56* | (2023.01) |
| *H04N 23/57* | (2023.01) |

(52) U.S. Cl.
CPC .............. *G03B 30/00* (2021.01); *B60J 1/02* (2013.01); *H04N 23/45* (2023.01); *H04N 23/54* (2023.01); *H04N 23/55* (2023.01); *H04N 23/56* (2023.01); *H04N 23/57* (2023.01)

(58) Field of Classification Search
CPC ... G03B 30/00; B60J 1/02; H04N 23/45; H04N 23/54; H04N 23/55; H04N 23/56; H04N 23/57
See application file for complete search history.

(56) References Cited

U.S. PATENT DOCUMENTS

| | | | |
|---|---|---|---|
| 5,400,069 A | 3/1995 | Braun et al. | |
| 8,067,077 B2* | 11/2011 | Bauer et al. | H01Q 9/28 428/40.9 |
| 8,934,052 B2* | 1/2015 | Luan | H04N 23/55 348/374 |
| 9,097,375 B2* | 8/2015 | Hanson et al. | F16J 15/008 |
| 9,976,973 B2* | 5/2018 | Watkins et al. | G01N 15/1245 |
| 10,054,721 B2* | 8/2018 | Hsu et al. | G02B 7/021 |
| 10,155,824 B2* | 12/2018 | Fujikawa et al. | A61Q 19/007 |
| 10,347,179 B2* | 7/2019 | Kim et al. | G09G 3/3233 |
| 2009/0078873 A1* | 3/2009 | Sakemoto et al. | H04N 5/33 250/339.11 |
| 2010/0046059 A1* | 2/2010 | McCabe et al. | B60R 1/12 359/263 |

(Continued)

FOREIGN PATENT DOCUMENTS

CN 112449037 A * 3/2021 .............. H04M 1/0264

OTHER PUBLICATIONS

Machine translation of CN-12449037-A.*

(Continued)

*Primary Examiner* — Frank F Huang
(74) *Attorney, Agent, or Firm* — CANTOR COLBURN LLP

(57) ABSTRACT

A vehicle, window for the vehicle and lens assembly. The window includes a first glass layer and a second glass layer separated from the first glass layer by a gap. An image sensor is disposed in the gap. A lens is disposed in the gap for focusing light passing through one of the first glass layer and the second glass layer onto the image sensor.

20 Claims, 9 Drawing Sheets

(56) References Cited

U.S. PATENT DOCUMENTS

| | | | | |
|---|---|---|---|---|
| 2011/0144284 | A1* | 6/2011 | Heuer et al. | C08L 69/00 |
| | | | | 525/394 |
| 2013/0106787 | A1* | 5/2013 | Lee | H04N 5/33 |
| | | | | 345/175 |
| 2015/0181099 | A1* | 6/2015 | Van Der Tempel et al. | |
| | | | | G01S 17/86 |
| | | | | 348/135 |
| 2017/0094271 | A1* | 3/2017 | Liu et al. | H04N 19/176 |
| 2017/0220844 | A1* | 8/2017 | Jones et al. | H04N 23/54 |
| 2018/0048909 | A1* | 2/2018 | Liu et al. | H04N 19/105 |
| 2018/0081093 | A1* | 3/2018 | Wang et al. | G02B 5/0231 |
| 2018/0103260 | A1* | 4/2018 | Chuang et al. | H04N 19/51 |
| 2018/0124394 | A1* | 5/2018 | Xu et al. | H04N 19/593 |
| 2018/0152727 | A1* | 5/2018 | Chuang et al. | H04N 19/70 |
| 2021/0372645 | A1* | 12/2021 | Harder | F24F 11/52 |

OTHER PUBLICATIONS

Slobodin, D., "Displays with Integrated Microcamera Arrays for Image Capture and Sensing", Paper 54-2, May 2021, Display Week 2021, IdeaFarm, 39 Pages.

Williams, A., "Two Way Mirror Improves Video Conferencing", Hackaday, May 29, 2020, 10 Pages, URL: https://hackaday.com/2020/05/29/two-way-mirror-improves-video-conferencing/.

\* cited by examiner

CAMERA SYSTEM LAMINATED INTO GLASS USING MICROSENSOR AND LENS

INTRODUCTION

The subject disclosure relates to camera systems in vehicles and, in particular, to a camera system that is embedded within a window of the vehicle.

A vehicle can employ an on-board camera system that provides an image of its surrounding environment. The image can be provided for various reasons, such as for safety reasons or, in the case of an autonomous vehicle, for use in navigation of the vehicle. Typically, a camera is placed in the interior cabin of the vehicle and up against a window or windshield of the vehicle. Such camera systems require a certain amount of packaging space for the camera as well as the need for a visible opening through the window for the camera to see through. Accordingly, it is desirable to provide a camera system with smaller packaging space and which is not reliant on the visible opening.

SUMMARY

In one exemplary embodiment, a lens assembly is disclosed. The lens assembly include an image sensor disposed in a gap between a first glass layer and a second glass layer, and a lens disposed in the gap for focusing light passing through one of the first glass layer and the second glass layer onto the image sensor.

In addition to one or more of the features described herein, the lens is supported in the gap at a separation distance from the image sensor. The image sensor includes a plurality of image sensors and the lens includes a plurality of lenses, each of the plurality of lenses corresponding to a respective one of the plurality of image sensors. The lens assembly further includes a lens film, wherein the lens is formed in the lens film and the lens film is supported in the gap by one of an optical bonding material between the first glass layer and the second glass layer and a structure disposed between the first glass layer and the second glass layer. The lens assembly further includes an optical bonding layer between the first glass layer and the second glass layer, wherein a portion of the optical bonding layer is disposed between the lens and the image sensor to maintain a separation distance between the lens and the sensor. The lens assembly further includes an optical bonding layer between the first glass layer and the second glass layer, the optical bonding layer forming a hollow chamber between the first glass layer and the second glass layer. The lens assembly of claim 1, further comprising an LED disposed in the gap, another lens in the gap for dispersing light from the LED and a film in the gap transmissive at infrared wavelengths.

In another exemplary embodiment, a window for a vehicle is disclosed. The window includes a first glass layer, a second glass layer separated from the first glass layer by a gap, an image sensor disposed in the gap, and a lens disposed in the gap for focusing light passing through one of the first glass layer and the second glass layer onto the image sensor.

In addition to one or more of the features described herein, the lens is supported in the gap at a separation distance from the image sensor. The image sensor includes a plurality of image sensors and the lens includes a plurality of lenses, each of the plurality of lenses corresponding to a respective one of the plurality of image sensors. The window further includes a lens film, wherein the lens is formed in the lens film and the lens film is supported in the gap by one of an optical bonding material between the first glass layer and the second glass layer; and a structure disposed between the first glass layer and the second glass layer. The window further includes an optical bonding layer between the first glass layer and the second glass layer, wherein a portion of the optical bonding layer is disposed between the lens and the image sensor to maintain a separation distance between the lens and the sensor. The window further includes an optical bonding layer between the first glass layer and the second glass layer, the optical bonding layer forming a hollow chamber between the first glass layer and the second glass layer. The window further includes an LED disposed in the gap, another lens in the gap for dispersing light from the LED and a film in the gap transmissive at infrared wavelengths.

In yet another exemplary embodiment, a vehicle is disclosed. The vehicle includes a window having a first glass layer and a second glass layer separated from the first glass layer by a gap, an image sensor disposed in the gap, and lens disposed in the gap for focusing light passing through one of the first glass layer and the second glass layer onto the image sensor.

In addition to one or more of the features described herein, the image sensor includes a plurality of image sensors and the lens includes a plurality of lenses, each of the plurality of lenses corresponding to a respective one of the plurality of image sensors. The vehicle further includes a lens film, wherein the lens is formed in the lens film and the lens film is supported in the gap by one of an optical bonding material between the first glass layer and the second glass layer; and a structure disposed between the first glass layer and the second glass layer. The vehicle further includes an optical bonding layer between the first glass layer and the second glass layer, wherein a portion of the optical bonding layer is disposed between the lens and the image sensor to maintain a separation distance between the lens and the sensor. The vehicle further includes an optical bonding layer between the first glass layer and the second glass layer, the optical bonding layer forming a hollow chamber between the first glass layer and the second glass layer. The vehicle further includes an LED disposed in the gap, another lens in the gap for dispersing light from the LED and a film in the gap transmissive at infrared wavelengths.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
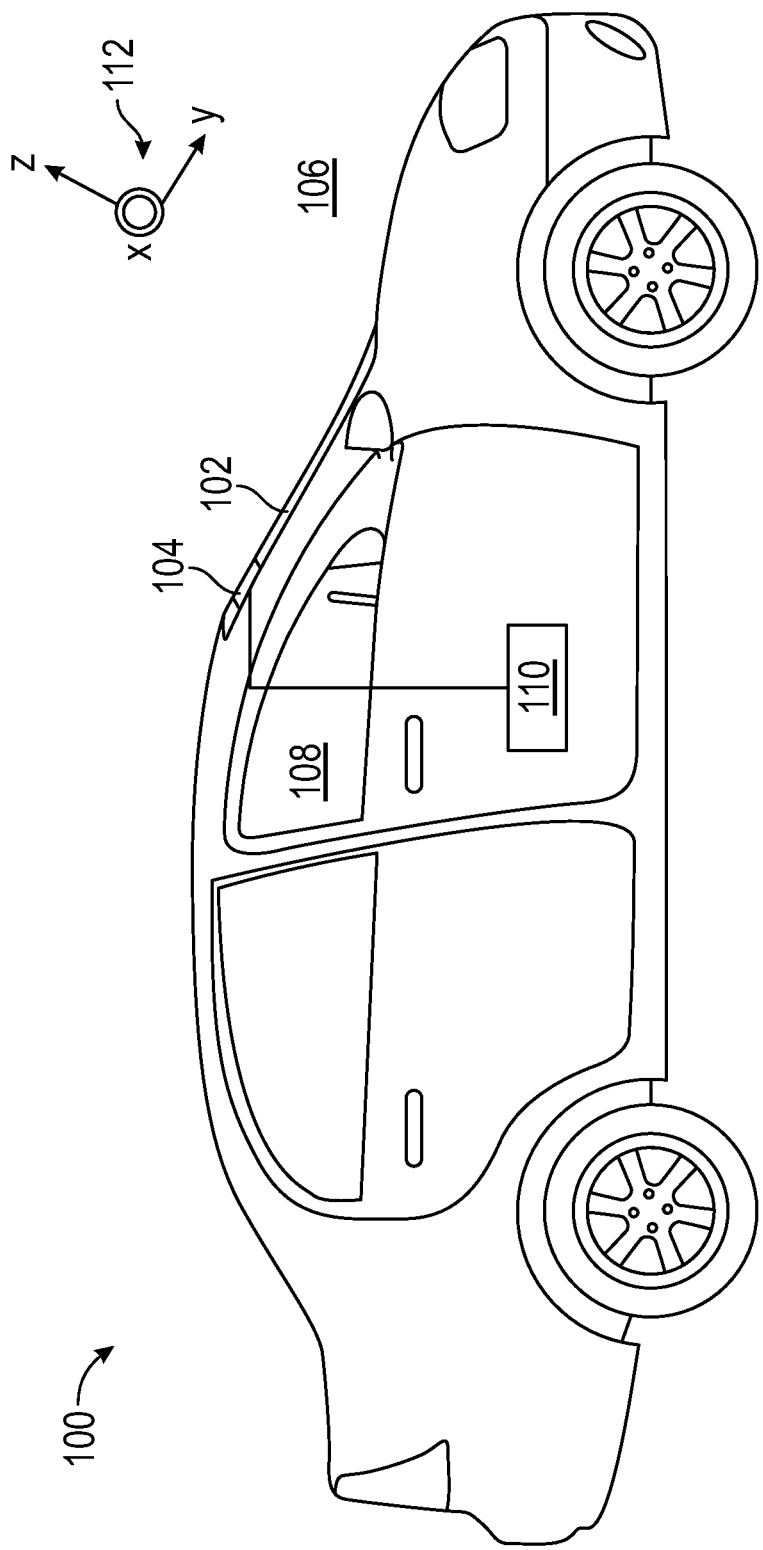
FIG. 1 shows a vehicle, in an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100. The vehicle 100 includes a window 102 having a camera system 104 embedded therein. The window 102 can be any window of the vehicle 100, including a windshield, a side window, rear window, etc. In addition, the window 102 can be a glass surface of an object, such as a mirror, etc. For illustrative purposes, the window 102 as discussed herein is a windshield that separates an outer region 106 of the vehicle 100 from an interior region 108. As disclosed herein, a camera system 104 is embedded within the windshield. The camera system 104 is coupled to a processor 110, which receives data or a signal from the camera system and records an image based on the data or signal. The processor 110 can use the image for various purposes, such as vehicle monitoring, vehicle navigation, etc. For ease of illustration, a coordinate system 112 is shown corresponding to a location of the camera system 104 within the window 102. The z-axis of the coordinate system 112 is directed perpendicularly out of the window 102 and into the outer region 106. The x-axis and y-axis lie within, or substantially within, the plane of the window 102.

Figure 2:
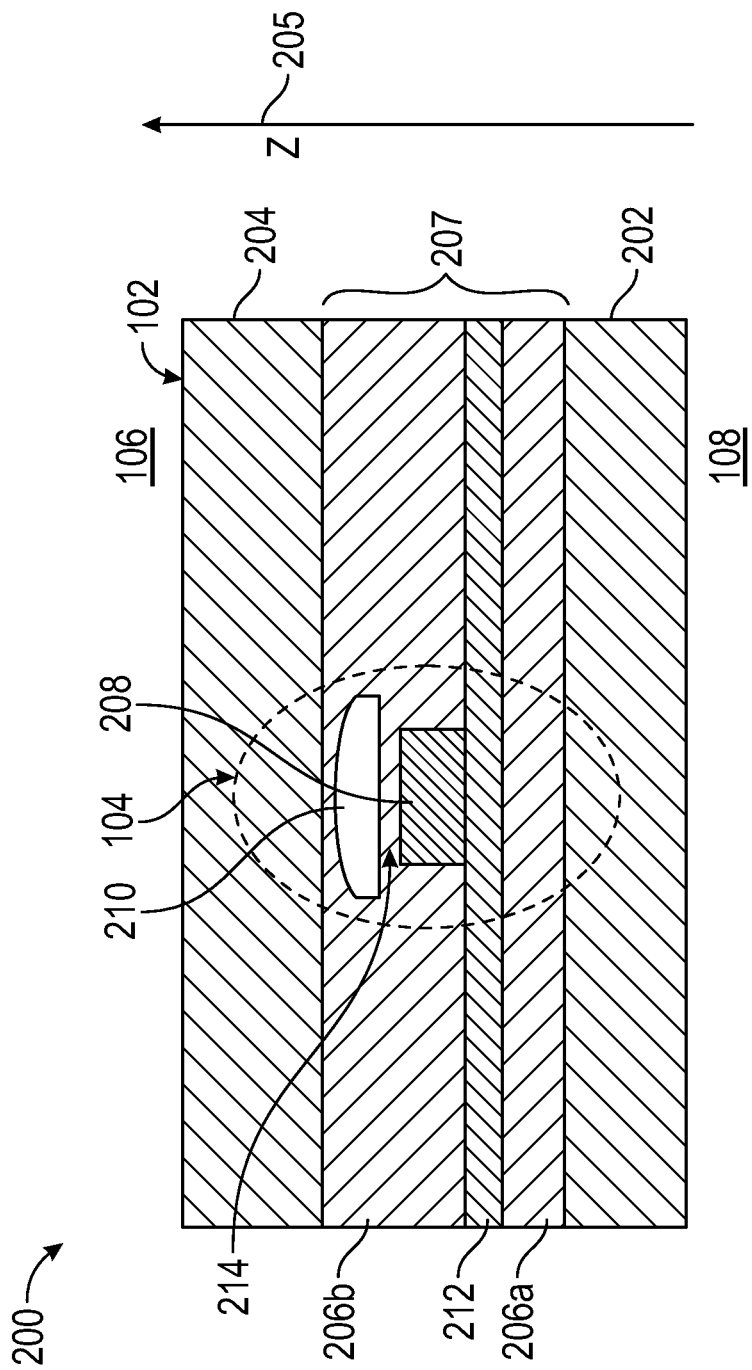
FIG. 2 shows a side sectional view through a window of the vehicle and a camera system embedded therein, in an embodiment.

FIG. 2 shows a side sectional view 200 through a window 102 of the vehicle 100 and a camera system 104 embedded therein, in an embodiment. The z-axis 205 of the coordinate system 112 is shown for ease of illustration. The window 102 includes a first glass layer (inner glass layer 202) and a second glass layer (outer glass layer 204). An optical bonding material is disposed within a gap 207 between the inner glass layer 202 and the outer glass layer 204. The optical bonding material can be an adhesive material. The optical bonding material is optically transparent or optically clear.

The camera system 104 includes an image sensor 208 and a lens 210. The image sensor 208 and the lens 210 are embedded within the optical bonding layer 206b. Light entering the window 102 via the outer glass layer 204 passes through the lens 210 and is focused on the image sensor 208. The image sensor 208 can be a photodetector array, charged coupled device or any other suitable imaging device. The image sensor 208 is disposed on a backplane film 212 and is electrically coupled to the backplane film. The backplane film 212 includes conductive wires therein through which electrical signals can be passed from the image sensor 208 to other devices, such as the processor 110. The conductive wires can also be used to provide power to the image sensor 208. The backplane film 212 can be a transparent substrate or a black printed substrate. As shown in FIG. 2 the optical bonding material can be used to form a plurality of bonding layers, with layers on both sides of the backplane film 212. In the embodiment of FIG. 2, the optical bonding material forms a bottom bonding layer 206a and the optical bonding layer 206b. The bottom bonding layer 206a is disposed between the inner glass layer 202 and the backplane film 212. The optical bonding layer 206b is disposed between the backplane film 212 and the outer glass layer 204.

The lens 210 is located in front of the image sensor 208 and is separated from the image sensor 208 by a separation distance 214. In various embodiments, the separation distance 214 is a focal length of the lens 210. Therefore, light passing through the lens 210 via the outer glass layer 204 is focused by the lens onto the image sensor 208. The lens 210 also defines a field of view for the image sensor 208. In various embodiments, the lens is a micro-lens. The lens 210 is embedded in the optical bonding layer 206b at a separation distance 214 from the image sensor 208 and the optical bonding layer 206b maintains the separation distance 214. The optical properties of the optical bonding layer 206b can be selected to facilitate optical efficiency of the lens 210 or transmission of light from the lens 210 to the image sensor 208.

Figure 3:
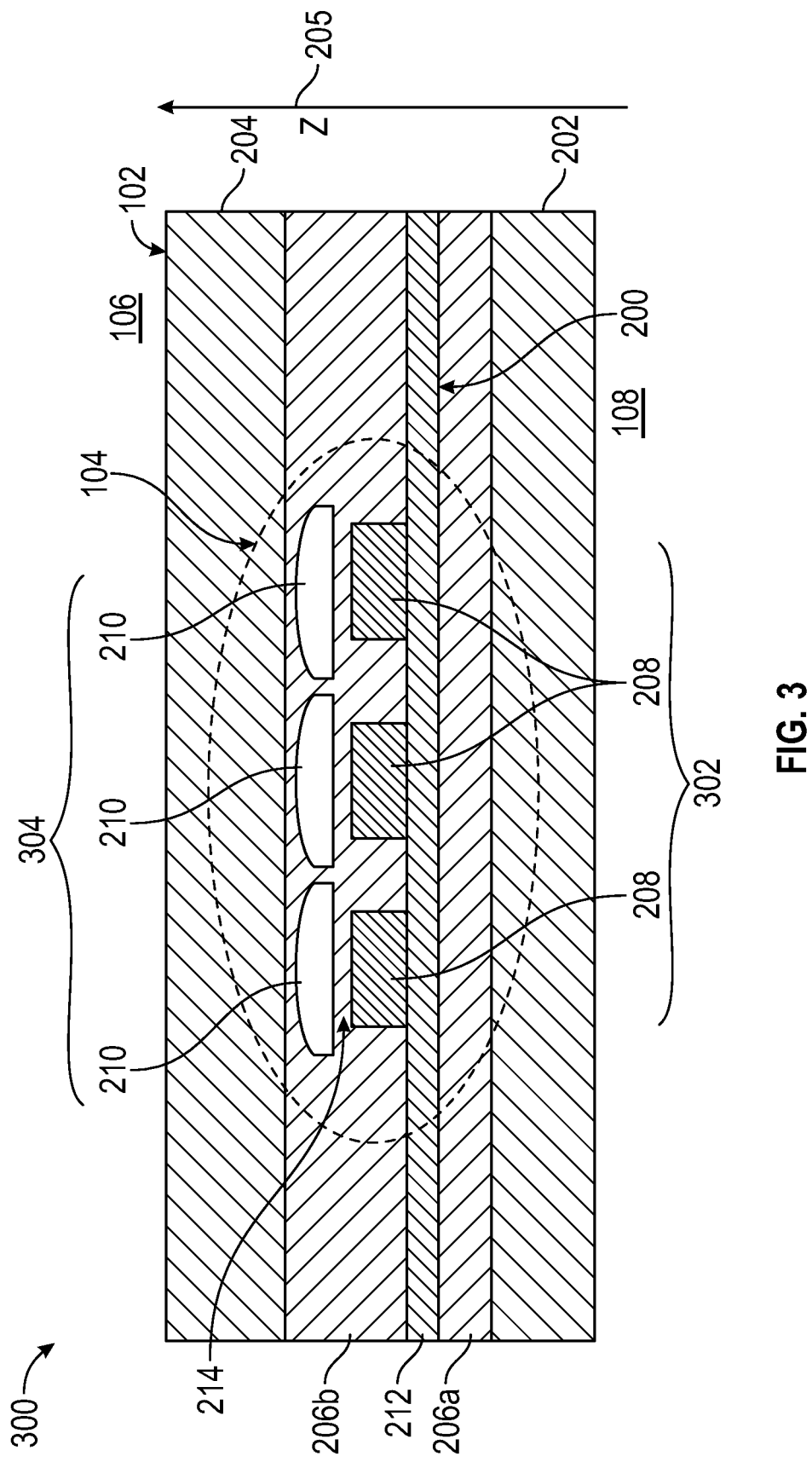
FIG. 3 shows a side sectional view through the window and the camera system in another embodiment.

FIG. 3 shows a side sectional view 300 through the window 102 and the camera system 104 in another embodiment. The camera system 104 includes an image sensor array 302 including a plurality of image sensors 208 and a lens array 304 including a plurality of lenses 210. Each image sensor 208 of the image sensor array 302 is disposed on, and electrically coupled to, the backplane film 212. Each lens 210 of the lens array 304 is located in front of a corresponding image sensor 208 of the image sensor array 302 and separated from its corresponding image sensor 208 by a separation distance 214 (e.g., the focal length of the lens). A portion of the optical bonding layer 206b maintains the separation distance 214 between each of lens 210 and its corresponding image sensor 208. In the embodiment of FIG. 3, each lens 210 is a separate element that is not connected to its adjacent or neighboring lens.

Figure 4:
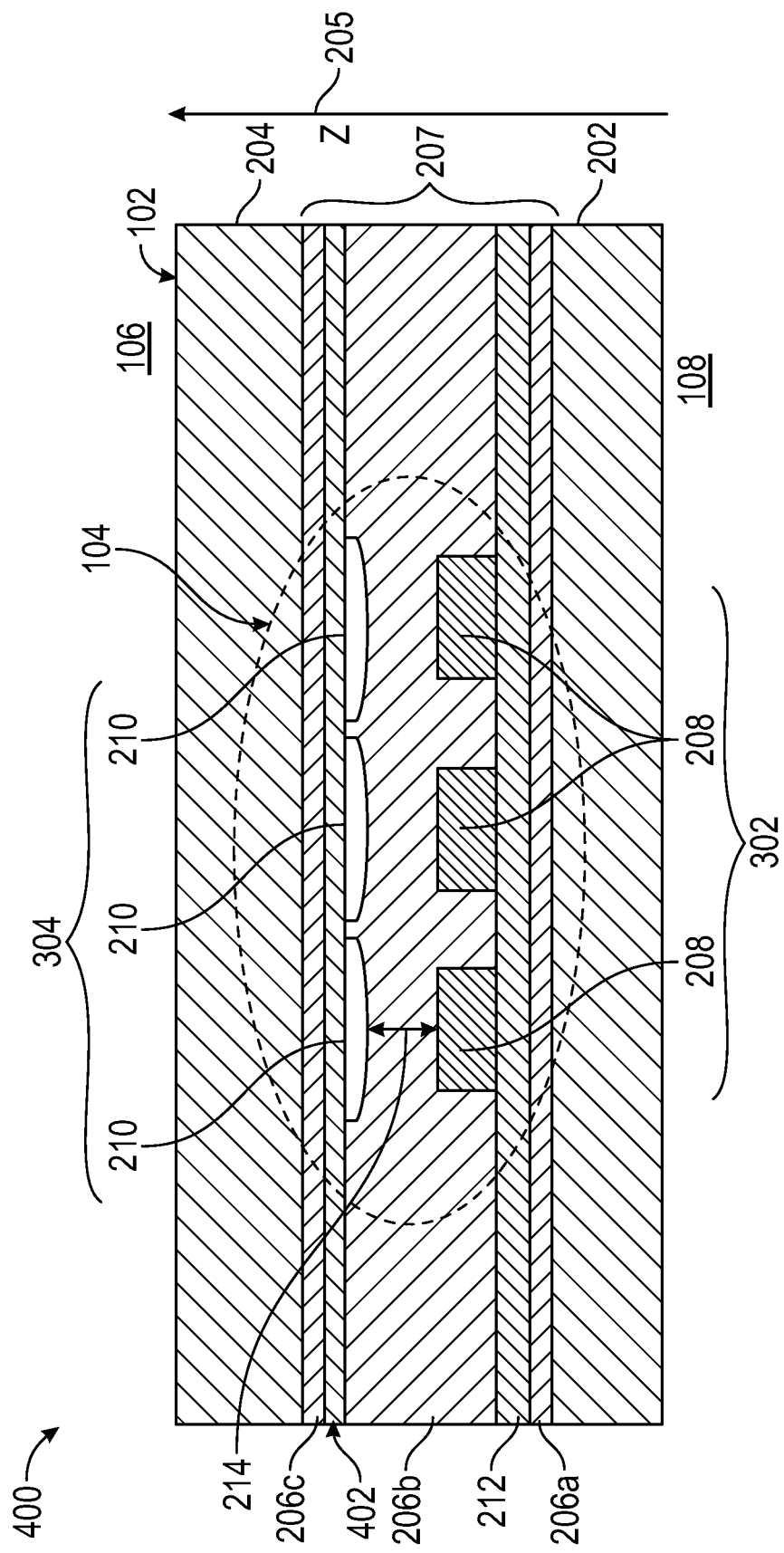
FIG. 4 shows a side sectional view through the window and the camera system in yet another embodiment.

FIG. 4 shows a side sectional view 400 through the window 102 and the camera system 104 in yet another embodiment. A micro-lens film 402 is disposed in the gap 207 between the inner glass layer 202 and the outer glass layer 204. The micro-lens film 402 can be a planar sheet, or substantially planar, sheet of material. The lenses 210 of the lens array 304 are formed as a part of the micro-lens film 402. The micro-lens film 402 can be placed between the optical bonding layer 206b and a top bonding layer 206c. The top bonding layer 206c is made of the optical bonding material. The optical bonding layer 206b has a thickness that maintains the lens array 304 at a separation distance 214 from the image sensor array 302, thereby facilitating the placement of each lens 210 at the separation distance 214 (i.e., the focal length) from its corresponding image sensor 208. This reduces the labor required to place each lens individually with respect to its corresponding sensor, as is performed when manufacturing the embodiment of FIG. 3.

Figure 5:
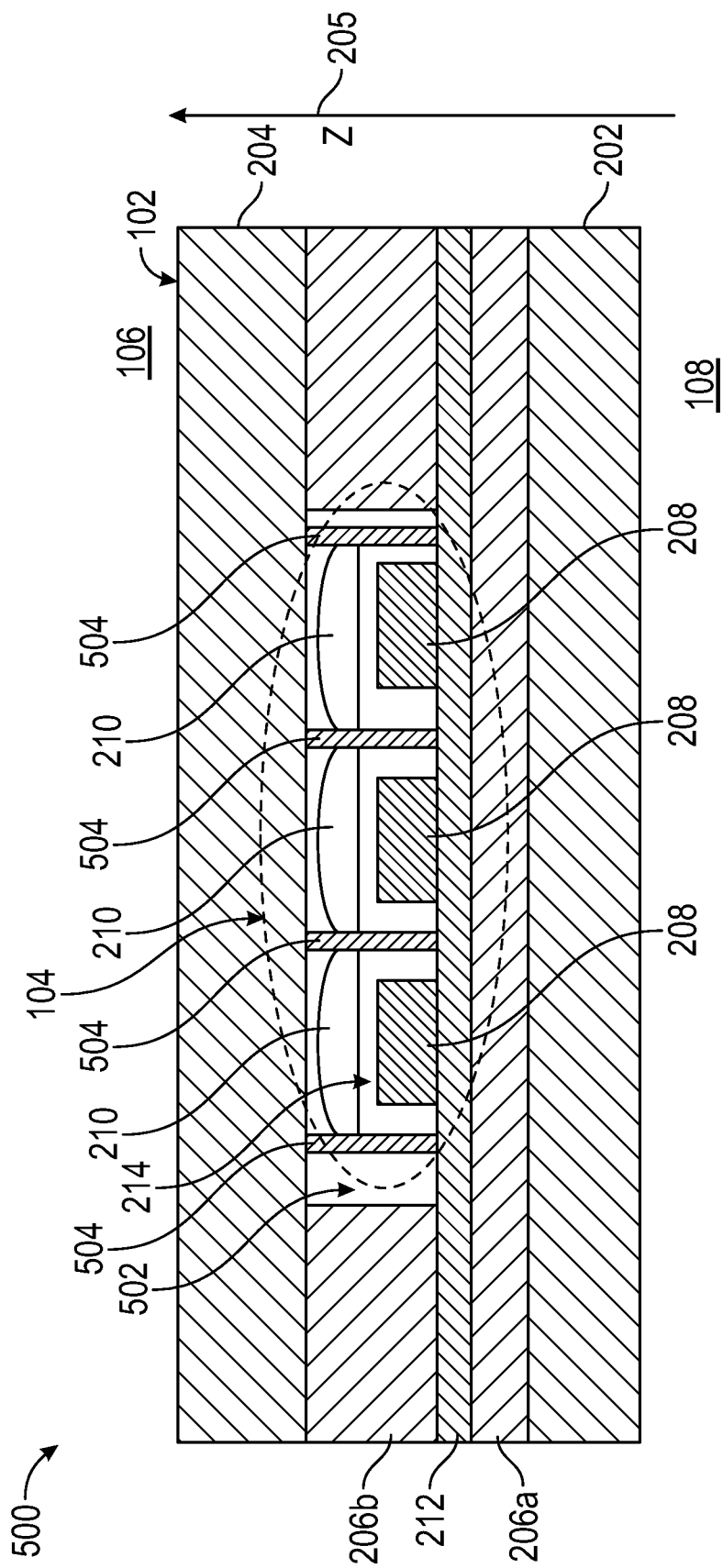
FIG. 5 shows a side sectional view through the window and the camera system in yet another embodiment.

FIG. 5 shows a side sectional view 500 through the window 102 and the camera system 104 in yet another embodiment. A hollow chamber 502 is formed in the optical bonding layer 206b. The image sensors 208 and the lenses 210 are disposed in the hollow chamber 502. A structure 504 is disposed within the hollow chamber 502 to hold the lenses 210 in the hollow chamber 502 at the separation distance 214 from their corresponding image sensors 208. The lenses 210 can be separate elements or part of a micro-lens film 402.

Figure 6:
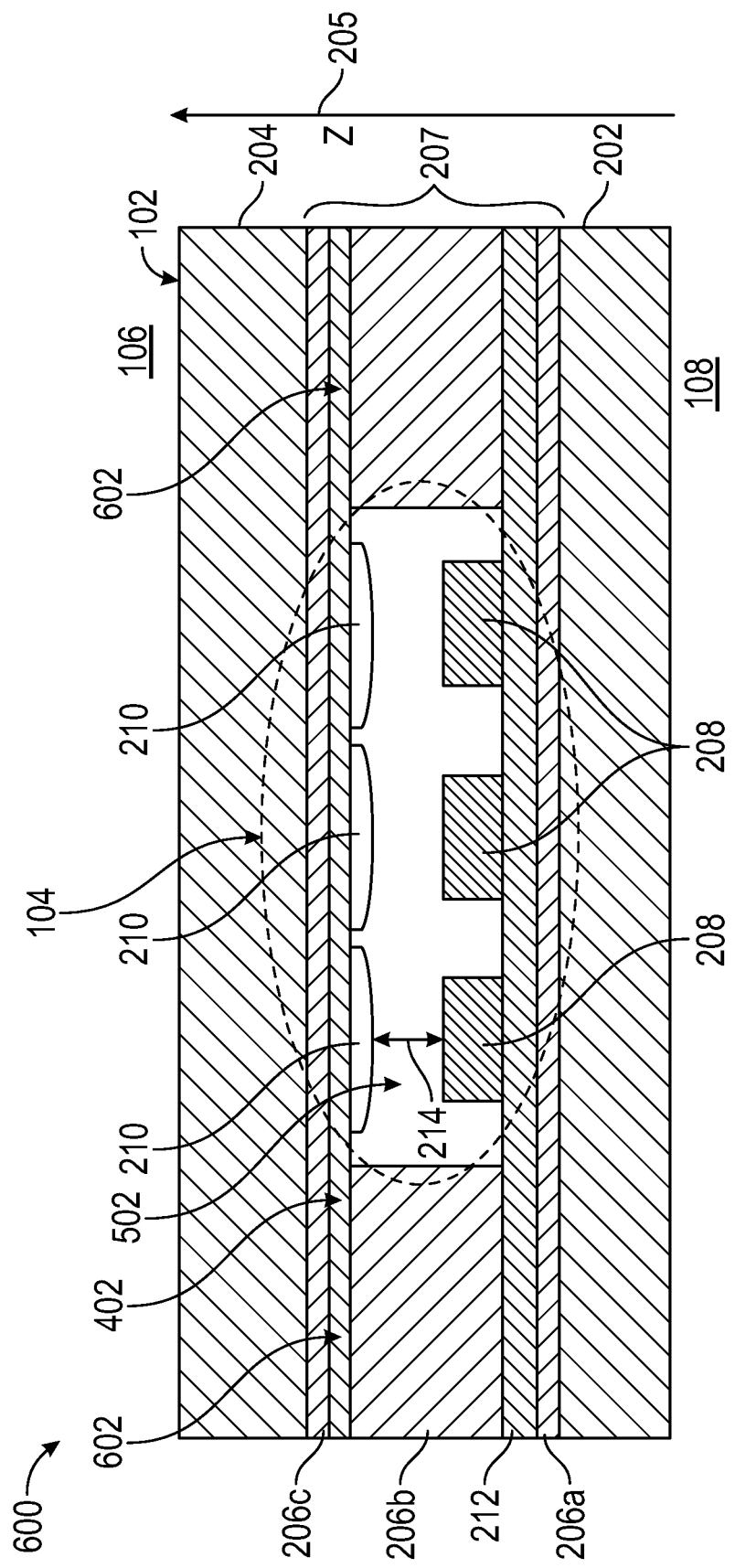
FIG. 6 shows a side sectional view through the window and the camera system in yet another embodiment.

FIG. 6 shows a side sectional view 600 through the window 102 and the camera system 104 in yet another embodiment. The optical bonding layer 206b includes the hollow chamber 502, and the image sensors 208 are disposed in the hollow chamber 502. Micro-lens film 402 includes the lenses 210. The outer edges 602 of the micro-lens film 402 are sandwiched between the optical bonding layer 206*b* and a top bonding layer 206*c*, allowing the micro-lens film 402 to extend along a roof or top surface of the hollow chamber 502, thereby suspending the lenses 210 above their respective image sensors 208 at the separation distance 214. The top bonding layer 206*c* is disposed between the micro-lens film 402 and the outer glass layer 204.

Figure 7:
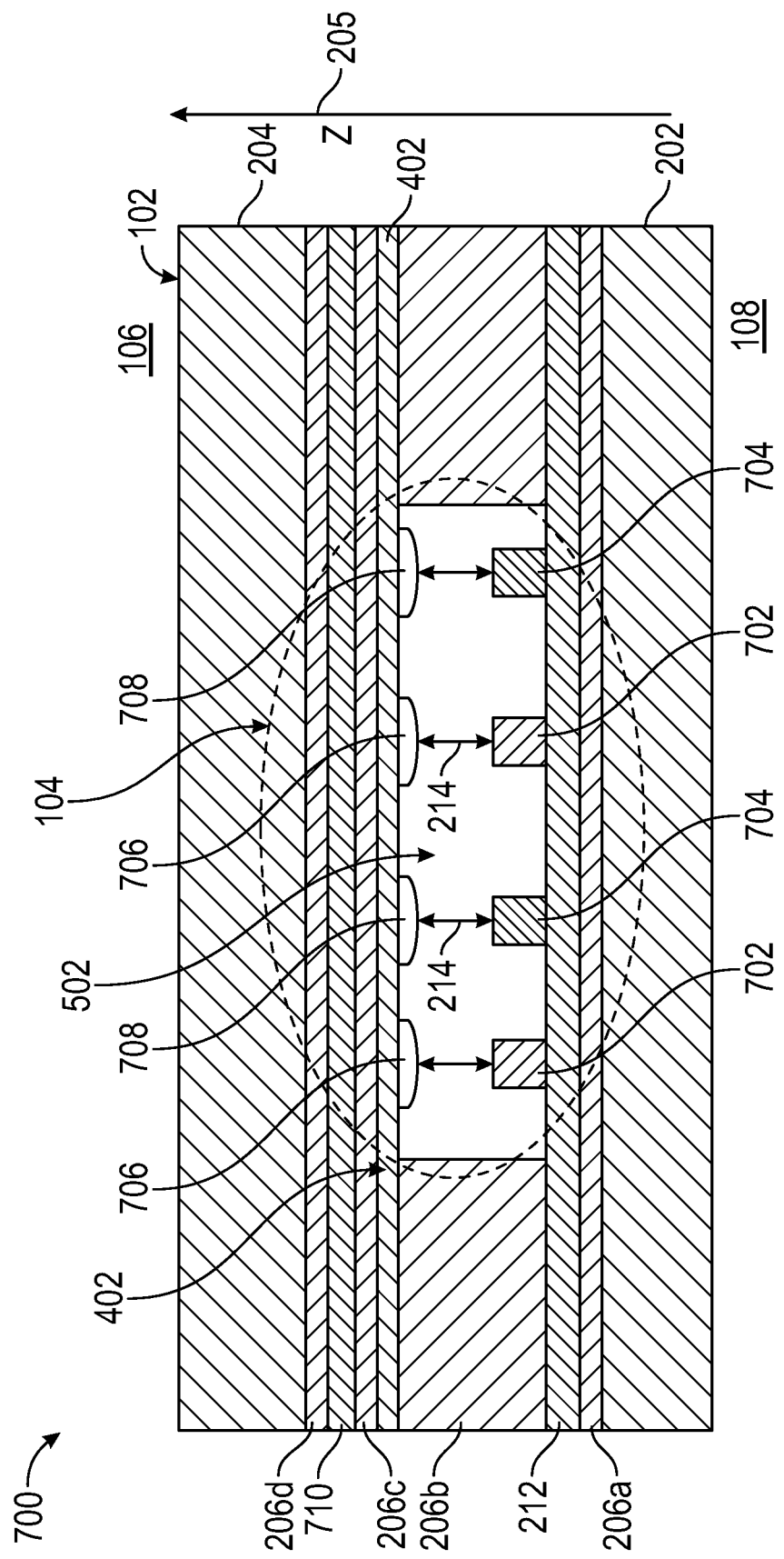
FIG. 7 shows a side sectional view through the window and the camera system in yet another embodiment.

FIG. 7 shows a side sectional view 700 through the window 102 and the camera system 104 in yet another embodiment. The embodiment of FIG. 7 includes the hollow chamber 502, micro-lens film 402 and the top bonding layer 206*c* of FIG. 6. Instead of the array of image sensors 208 in FIG. 6, FIG. 7 includes an array of infrared (IR) micro light emitting diodes (IR micro-LEDs 702) and IR micro sensors 704. The IR micro-LEDs 702 and IR micro sensors 704 can form an alternating pattern. The micro-lens film 402 includes a first set of lenses 706 for the IR micro-LEDs 702 and a second set of lenses 708 for the IR micro sensors 704. The micro-lens film 402 can be arranged so that the first set of lenses 706 lies in front of the IR micro-LEDs 702 and the second set of lenses 708 lies in front of the IR micro sensors 704, with each lens maintained at the separation distance 214 from their respective LEDs. The first set of lenses 706 disperses light from their respective IR micro-LEDs 702 into an environment, and the second set of lenses 708 focuses incoming light from the environment onto their respective IR micro sensors 704.

An interlayer band pass filter 710 and a cap bonding layer 206*d* are disposed between the top bonding layer 206*c* and the outer glass layer 204. The interlayer band pass filter 710 is disposed between the top bonding layer 206*c* and the cap bonding layer 206*d*. The interlayer band pass filter 710 is opaque in the visible light region of the electromagnetic spectrum and therefore hides or disguises the presence of the lenses and sensors. The interlayer band pass filter 710 can be transmissive in the infrared portion of the electromagnetic spectrum.

Figure 8:
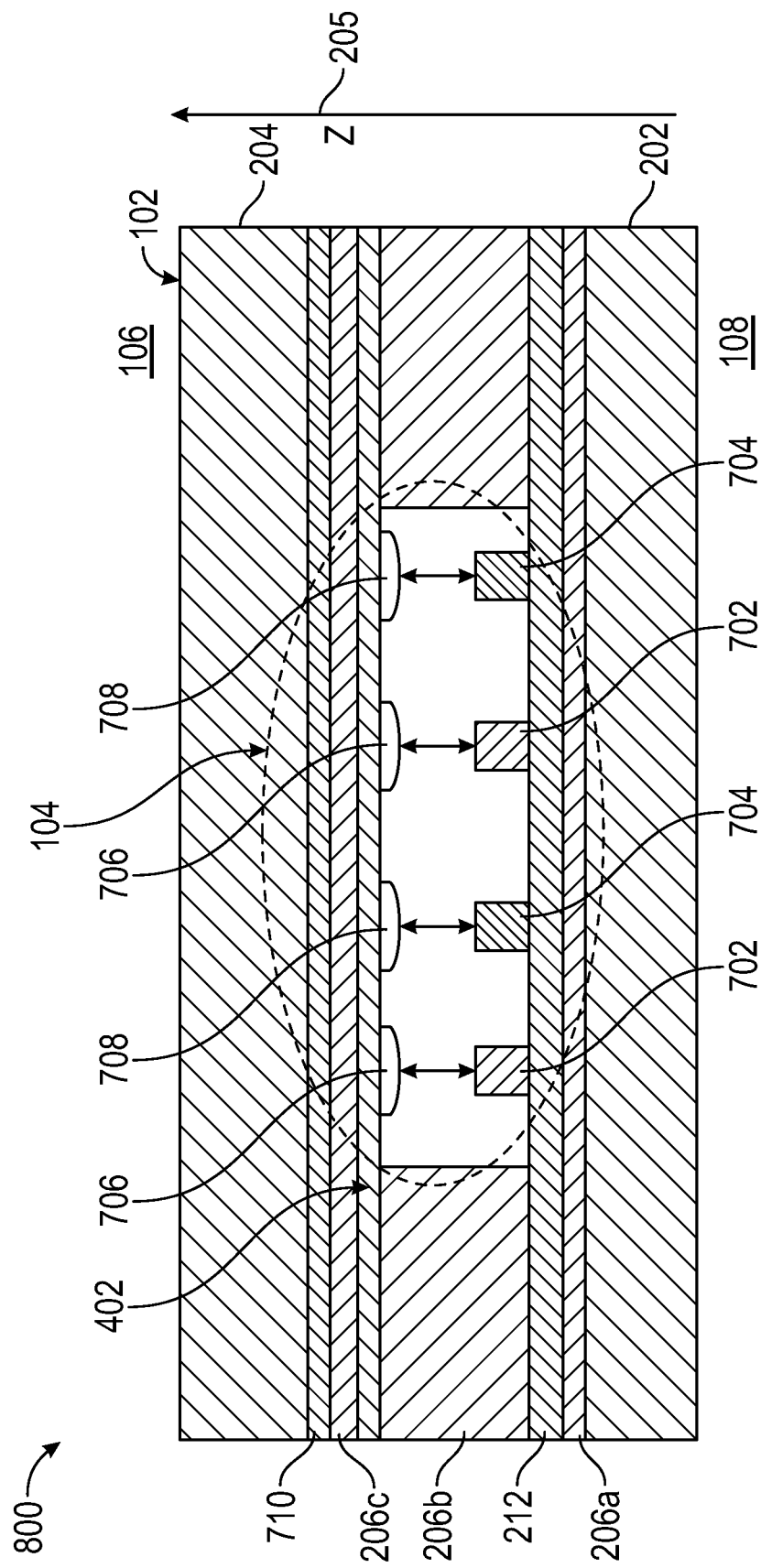
FIG. 8 shows a side sectional view through the window and the camera system in yet another embodiment.

FIG. 8 shows a side sectional view 800 through the window 102 and the camera system 104 in yet another embodiment. In contrast to FIG. 7, the cap bonding layer 206*d* is absent from FIG. 8 and the interlayer band pass filter 710 is therefore in direct contact with the outer glass layer 204.

FIGS. 2, 3 and 5 show lenses with concave optical surfaces facing away from their respective image, sensors while FIGS. 4 and 6-8 shows lenses with concave optical surfaces facing toward their respective image sensors. It is to be noted, however, that the direction of orientation of the lenses or their concave optical surfaces is not meant as a limitation. In addition, the optical surfaces can be either concave or convex depending on manufacturability or applications.

Figure 9:
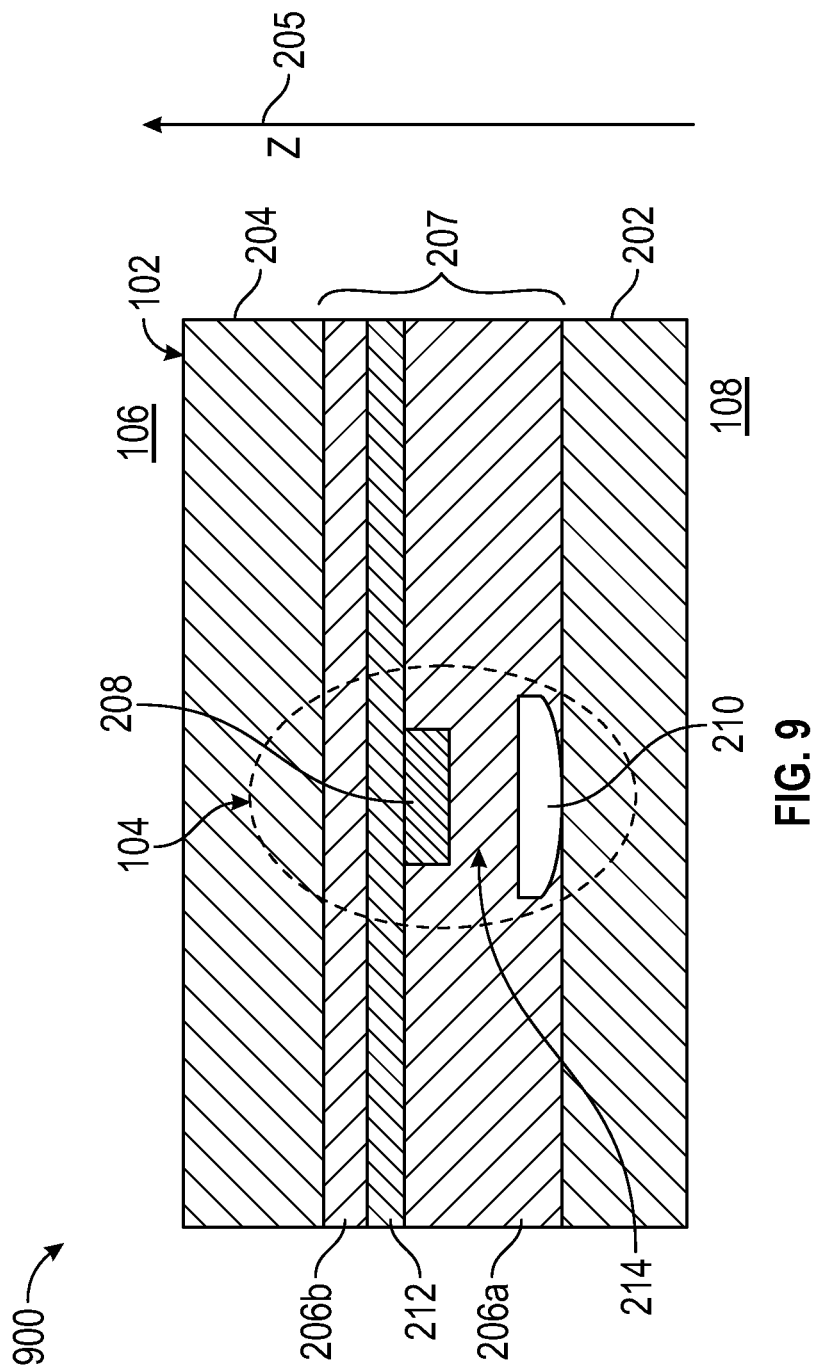
FIG. 9 shows a side sectional view through the window and the camera system in yet another embodiment.

FIG. 9 shows a side sectional view 900 through the window 102 and the camera system 104 in yet another embodiment. The camera system 104 includes the image sensor 208 and the lens 210 arranged in an opposite orientation from the arrangement shown in FIG. 2. The image sensor 208 and the lens 210 are disposed within the bottom bonding layer 206*a* between the inner glass layer 202 and the backplane film 212. The image sensor 208 is coupled to the backplane film 212 and the lens 210 is proximate the inner glass layer 202. The bottom bonding layer 206*a* maintains the separation distance 214 between the image sensor 208 and the lens 210 at a focal length of the lens 210. This arrangement of image sensor 208 and lens 210 allows for imaging of the cabin or interior region 108.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A lens assembly, comprising:
a laminate comprising a first glass layer, a second glass layer, and an optical bonding material between the first glass layer and the second glass layer, wherein the first glass layer is in direct contact with a bottommost surface of the optical bonding material and the second glass layer is in direct contact with a topmost surface of the optical bonding material;
an image sensor disposed in a gap between the first glass layer and the second glass layer, the image sensor embedded within the optical bonding material; and
a lens disposed in the gap for focusing light passing through one of the first glass layer and the second glass layer onto the image sensor, the lens embedded within the optical bonding material.

2. The lens assembly of claim 1, wherein the lens is supported in the gap at a separation distance from the image sensor.

3. The lens assembly of claim 1, wherein the image sensor includes a plurality of image sensors and the lens includes a plurality of lenses, each of the plurality of lenses corresponding to a respective one of the plurality of image sensors.

4. The lens assembly of claim 1, further comprising a lens film, wherein the lens is formed in the lens film and the lens film is supported in the gap by one of: (i) the optical bonding material between the first glass layer and the second glass layer; and (ii) a structure disposed between the first glass layer and the second glass layer.

5. The lens assembly of claim 1, wherein a portion of the optical bonding material disposed between the lens and the image sensor fixes a separation distance between the lens and the sensor.

6. The lens assembly of claim 1, wherein the optical bonding layer defines a hollow chamber between the first glass layer and the second glass layer.

7. The lens assembly of claim 1, further comprising an LED disposed in the gap, another lens in the gap for dispersing light from the LED and a film in the gap transmissive at infrared wavelengths.

8. A window for a vehicle, comprising:
a laminate comprising a first glass layer, a second glass layer, and an optical bonding material between the first glass layer and the second glass layer, wherein the first glass layer is in direct contact with a bottommost surface of the optical bonding material and the second glass layer is in direct contact with a topmost surface of the optical bonding material, the second glass layer separated from the first glass layer by a gap;
an image sensor disposed in the gap, the image sensor embedded within the optical bonding material; and
a lens disposed in the gap for focusing light passing through one of the first glass layer and the second glass layer onto the image sensor, the lens embedded within the optical bonding material.

9. The window of claim 8, wherein the lens is supported in the gap at a separation distance from the image sensor.

10. The window of claim 8, wherein the image sensor includes a plurality of image sensors and the lens includes a plurality of lenses, each of the plurality of lenses corresponding to a respective one of the plurality of image sensors.

11. The window of claim 8, further comprising a lens film, wherein the lens is formed in the lens film and the lens film is supported in the gap by one of: (i) the optical bonding material between the first glass layer and the second glass layer; and (ii) a structure disposed between the first glass layer and the second glass layer.

12. The window of claim 8, wherein a portion of the optical bonding material disposed between the lens and the image sensor fixes a separation distance between the lens and the sensor.

13. The window of claim 8, wherein the optical bonding layer defines a hollow chamber between the first glass layer and the second glass layer.

14. The window of claim 8, further comprising an LED disposed in the gap, another lens in the gap for dispersing light from the LED and a film in the gap transmissive at infrared wavelengths.

15. A vehicle, comprising:
a window having a first glass layer, a second glass layer separated from the first glass layer by a gap, and an optical bonding material between the first glass layer and the second glass layer, wherein the first glass layer is in direct contact with a bottommost surface of the optical bonding material and the second glass layer is in direct contact with a topmost surface of the optical bonding material;
an image sensor disposed in the gap, the image sensor embedded within the optical bonding material; and
a lens disposed in the gap for focusing light passing through one of the first glass layer and the second glass layer onto the image sensor, the lens embedded within the optical bonding material.

16. The vehicle of claim 15, wherein the image sensor includes a plurality of image sensors and the lens includes a plurality of lenses, each of the plurality of lenses corresponding to a respective one of the plurality of image sensors.

17. The vehicle of claim 15, further comprising a lens film, wherein the lens is formed in the lens film and the lens film is supported in the gap by one of: (i) the optical bonding material between the first glass layer and the second glass layer; and (ii) a structure disposed between the first glass layer and the second glass layer.

18. The vehicle of claim 15, wherein a portion of the optical bonding material disposed between the lens and the image sensor fixes a separation distance between the lens and the sensor.

19. The vehicle of claim 15, wherein the optical bonding layer defines a hollow chamber between the first glass layer and the second glass layer.

20. The vehicle of claim 15, further comprising an LED disposed in the gap, another lens in the gap for dispersing light from the LED and a film in the gap transmissive at infrared wavelengths.

* * * * *